United States Patent [19]

Haury et al.

[11] Patent Number: 4,542,030

[45] Date of Patent: Sep. 17, 1985

[54] PROCESS FOR PREPARING LOW CALORIE FRENCH FRY PRODUCT

[75] Inventors: John F. Haury, Payette, Id.; Charles T. Hensley, Ontario, Oreg.

[73] Assignee: Ore-Ida Foods, Inc., Boise, Id.

[21] Appl. No.: 708,889

[22] Filed: Mar. 6, 1985

Related U.S. Application Data

[63] Continuation of Ser. No. 555,085, Nov. 25, 1983, abandoned.

[51] Int. Cl.$^4$ .............................................. A23L 1/216
[52] U.S. Cl. .................................... 426/262; 426/438; 426/441; 426/637; 426/808
[58] Field of Search ............... 426/102, 262, 271, 302, 426/303, 307, 637, 438, 441, 808, 804

[56] References Cited

U.S. PATENT DOCUMENTS

| | | | |
|---|---|---|---|
| 2,498,024 | 2/1950 | Baxter | 426/441 X |
| 3,007,800 | 11/1961 | Kimbrough et al. | 426/637 X |
| 3,085,020 | 4/1963 | Backinger et al. | 426/438 X |
| 3,205,074 | 9/1965 | Nack et al. | 426/438 X |
| 3,397,993 | 8/1968 | Strong | 426/438 X |
| 3,865,964 | 2/1975 | Kellermeier et al. | 426/438 X |
| 4,219,975 | 8/1980 | Saunders et al. | 426/637 X |
| 4,276,314 | 6/1981 | Andersen | 426/637 X |

FOREIGN PATENT DOCUMENTS

| | | | |
|---|---|---|---|
| 750479 | 10/1970 | Belgium | 426/441 |
| 1002837 | 9/1965 | United Kingdom | 426/438 |
| 2078081 | 1/1982 | United Kingdom | 426/438 |

OTHER PUBLICATIONS

Furia, *Handbook of Food Additives*, 1968, p. 38, Gp 130.

*Primary Examiner*—Arthur L. Corbin
*Attorney, Agent, or Firm*—Burns, Doane, Swecker & Mathis

[57] ABSTRACT

A french fry product of low calorie content is prepared by dipping blanched potato strips in a solution containing sodium acid pyrophosphate and caramel, and optionally glucose. The strips containing the solution residue are panfried for a maximum time of 40 seconds at 320°–335° F., or alternatively sprayed with a fine coat of hot oil, and then frozen. Upon reconstitution, the product contains at least 10% less calories than a conventional french fry and as much as 45% less calories.

15 Claims, No Drawings

PROCESS FOR PREPARING LOW CALORIE FRENCH FRY PRODUCT

This application is a continuation, of application Ser. No. 555,085, filed Nov. 25, 1983, now abandoned.

BACKGROUND OF THE INVENTION

The present invention is directed to frozen potato products, and more particularly to an improved french fry product having a lower calorie content in comparison with conventional french fries.

French fries, with their unique taste and ease of preparation, have long been popular as a convenience food. Perhaps the most prevailing reason that they aren't consumed more than they already are is the fact that they tend to be higher in calorie content than other types of potato foods. For example, a 3 ounce serving of a baked potato without butter or sour cream has about 80 calories while french fries of a fairly conventional size measuring, e.g. ½-1 inch on a side, might contain around 130 calories for a 3 ounce serving, and smaller "shoestring" type french fries measuring e.g. ¼-½ inch on a side might have around 160 calories per serving. The higher calorie content associated with french fries is generally attributable to the oil that is absorbed during deep-fat frying of the potatoes.

It is a general object of the present invention to provide a novel process for preparing french fries that reduces their oil absorption, and hence reduces their calorie content, over conventional methods.

Various proposals for producing a french-fry-like product having reduced fat content are set forth in U.S. Pat. Nos. 3,812,274 and 4,269,861. In the process of the '274 patent, a cooked potato mash is extruded into strips, which are then subjected to hot-air treatments to provide a case-hardened crust on their outer surfaces. Apparently, the hardened surface reduces the amount of oil that is absorbed during frying.

The process disclosed in the '861 patent involves immersing french fry slices in hot oil, exposing them to hot, moist vapor, repeating the hot oil, vapor and hot oil treatments, and then exposing them to hot, dry atmosphere. This alternate oil and air treatment also produces a hardening, or "setting", of the exterior of the slices which reduces oil accumulation in the product.

It is another object of the present invention to provide a novel process for preparing lower calorie french fries that is not as complex and does not require as many lengthy processing steps as these prior art techniques.

SUMMARY OF THE INVENTION

Basically, a french fry product of lower calorie content is prepared in accordance with the present invention by reducing the frying time of the potato strips in hot oil relative to conventional practices, or by eliminating the frying altogether and instead adding oil through a controlled spraying step. Both of these approaches are intended to limit the amount of oil that is absorbed during processing. Preferably, the frying time for oil immersed products is no longer than 40 seconds and can be as low as 1 second. In addition, the temperature of the oil is kept at a relatively low level, e.g. as low as 275° F. to 390° F., which also lessens the amount of oil absorption. The alternative oil spray procedure involves controlled flow of the product under spray nozzles that are designed to yield a uniform application of the oil.

However, the reduced frying time, or the oil spraying, and the reduced temperature alone are not sufficient to produce a commercially acceptable product. This is due to the fact that the elimination or shortening of the frying step results in decreased browning of the product, to the extent that it may not be appealing to the consumer. Therefore, in conjunction with the reduction in the frying time, or the oil spraying, it is necessary to assure that adequate browning of the potato strips will occur. This objective is achieved in accordance with the present invention by immersing the potato strips in a "sugar drag" after the conventional peeling, slicing and blanching steps, and before frying or oil spraying. The sugar drag contains sodium acid pyrophosphate and caramel, and can also contain glucose, all of which become coated on the potato strips. During the frying process and even more so during reconstitution by cooking in a home oven, the coating results in a darkening of the product to give a french fry that has both a lower calorie content and a pleasing color. The greatly diminished oil content (e.g. 25-75% less oil depending on the frying or spraying conditions) is largely responsible for the lower calorie content.

Further features of the invention are discussed in greater detail hereinafter with reference to preferred embodiments thereof.

DETAILED DESCRIPTION

In the preparation of lower calorie french fries according to the present invention, whole fresh potatoes are subjected to the preliminary processing steps that are conventional to most french fry production techniques. These steps can include peeling the potatoes, for example by steam peeling or by caustic treatment followed with barrel washing. The peeled potatoes can be optionally pretreated in water at 140° F. for 45 minutes to soften their surface, for example, and then cut to produce straight or crinkle cut strips. To prepare a "skin on" type of product the barrel washing procedure is applied directly to the whole potatoes, without peeling, and the cleaned potatoes are optionally sorted for size and then cut in a conventional manner, after the optional pretreatment.

After being cut, the elongated potato strips are blanched in water, primarily to inactivate enzymes, gelatinize the starch and remove excess free sugars which might cause uncontrolled browning. The blanching can include immersing the potato strips in water at 140°-170° F. for 5-18 minutes, followed by 2-8 minutes in water at 90°-140° F. and then 2-8 minutes in water at 170°-195° F., for example. Alternatively, the blanching can consist of immersing the potato strips in water at 165°-195° F. for 4-24 minutes. Yet another alternative blanching procedure involves exposing the raw potato strips to live steam for 1-5 minutes.

The blanched potato strips are then dipped into a sugar drag. The sugar drag contains 0.2-0.4% by weight sodium acid pyrophosphate (SAPP) and 0.5-3.5% by weight caramel depending on the choice of caramel type. In addition, the sugar drag can include 0.5-2.5% glucose. The SAPP can be replaced by disodium ethylene diaminetetraacetate or any other suitable and effective food grade sequestering agent, in order to minimize product discoloration due to inorganic ions in the processing water. The particular concentration of caramel that is used will be dependent upon the properties of the caramel relating to color hues and color density imparted to the french fries. The color enhancing effect of the optional sugar component, e.g. glucose, is minor relative to the color imparted by the caramel. Any suitable reducing sugar can be substituted for the glucose to provide the same color enhancing effect. It may be preferable to add a sweet sugar, such as sucrose, to the sugar drag in order to provide a flavor enhancing effect as well.

Preferably, the sugar drag contains 0.2% by weight sodium acid pyrophosphate and 2.8 or 3.0% by weight caramel, depending on whether the potatoes are fried or oil sprayed, respectively. One caramel that has been found to be suitable for use in the context of the present invention is caramel No. 528, manufactured by D. D. Williamson and Co. of Louisville, Ky. The bright golden color of this caramel is particularly suited to this invention, although the single strength acid proof caramel Number 105, also manufactured by D. D. Williamson and Co., is a secondary but viable alternative caramel choice. Yet another alternative is to combine caramels to achieve a bright golden color with brown hues.

The sugar drag is maintained at a temperature in the range of 140°–180° F., preferably 160° F., and the potato strips are dipped into it for a period of 20–40 seconds, preferably about 30 seconds.

The following procedure is suggested to aid in the monitoring of the caramel concentration in the sugar drag and thereby control the color added to the product during the production. Liquid samples gathered from the sugar drag are either filtered or centrifuged to free them of suspended particles which would interfere with the monitoring. Then the supernatant or the filtrate is analyzed in a spectrophotometer for its optical density at the appropriate wavelength for the caramel in use (610 nanometers for caramel No. 528). A standard curve can be produced comparing known concentrations of the caramel against their optical density. Alternatively, potato strips taken directly from the fryer or from the caramel containing sugar drag can be quantitatively monitored for color using a reflectance colorimeter such as an Agtron ® Model E-5F (Magnuson Corporation, 475 Edison Way, Reno, Nev. 89510). In analogous fashion to the use of the spectrophotometer, a standard curve can be produced to define the reflectance colorimeter values vs. caramel concentration.

Once coated with the liquid from the sugar drag, the potato strips can be dried in ambient air or under the influence of heated moving air (100° to 180° F.) to remove from 3 to 20% of their weight. This step eliminates the uncontrolled boiling of surface water and at the higher levels of drying the tender crisp texture of the unfried, oil-sprayed product is greatly enhanced.

Immersion frying (albeit brief) to achieve calorie reduction has been successfully applied to both small strips, i.e. "shoestring" types of potato strips (which typically measure about ¼ inch on one side and between ¼–½ inch on the adjacent side) and large strips known for example as regular or (for the larger ones) steak fries (e.g. ⅜–7/16 on one side and between ⅜ and ⅝ inch on the adjacent side), including wedge-shaped strips from unpeeled potatoes. The calorie reduction techniques herein disclosed apply quite readily to straight cuts and to strips cut with a wavy edge pattern, known as crinkle cuts in the trade. Independent of the potato strip shape, a calorie and oil reduction is feasible using the techniques embodied in this invention.

The preferred fry oil temperature range is 275° to 390° F. for immersion frying. For the shoestring type of potato strips mentioned above, the oil reduction can be achieved in either of two ways. One is by short immersion at the higher end of the preferred temperature range (e.g., 5 to 20 seconds at 345° to 385° F.) preferably 8 to 12 seconds at 360° to 375° F. Otherwise, low oil content and decreased calories with equivalent texture qualities in the reconstituted product can be achieved with a longer frying at lower temperatures within the preferred range, (e.g., 12 to 30 seconds at 300° to 345° F.) preferably 15 to 20 seconds at 320° to 335° F.

As for the larger potato strips, two techniques have achieved the decreased calorie content that is desired: (1) lower temperature, short frying and (2) oil spraying. In the first technique, the preferred fry parameters for the larger potato strips are 15 to 40 seconds immersion fry at 300° to 350° F., preferably for 20 to 30 seconds at 320° to 335° F. For ease of implementation and for process control, the preferred embodiment of the oil and calorie reduction technique in large strips is via this brief immersion fry at the low temperature. The maintenance of a low level of frying oil in the fryer wherein the strips are partially covered with oil can be an added advantage to avoid excess oil uptake.

To achieve oil levels in the large strips (e.g. ⅜ to 9/16 inch on one side and ⅜ to ⅝ on the adjacent side), in the range of about 2% or less, the following oil spray technique is a practical alternative method. The same types of oil used in immersion frying are usable for spraying, considering that they may need to be filtered in order to avoid blocking the spray nozzles. For this technique, the oil is maintained at 120° to 200° F., preferably at 150° F. The spray nozzles to apply the oil are arranged to administer the oil evenly whether the oil be atomized during the spraying or simply sprayed in fine droplets (e.g. 500 to 1500 microns diameter) preferably over the potato strips in a single layer. The rate of application of the oil, as determined by the volume of oil that is sprayed and the speed of the moving potato strips, is preferably such that the weight of the potato strips is increased by 1 to 3% after spraying. In fact, this weight gain percentage is a reasonably accurate measure of the final percent oil content in the frozen french fries. A logical operation is to place spraying manifolds in an empty conventional fryer itself wherein the oil can be confined even though the product is not actually immersed into the oil.

After spraying or frying, the potato strips are frozen, packaged and stored or shipped for subsequent use. To reconstitute them for eating, they can be baked at a temperature of about 450° F. for about twenty minutes. Preferably, they should be turned after about ten minutes of baking to ensure evenness of cooking and browning.

Under the circumstances herein described, a calorie reduction of 10 to 45% can be achieved and this range of calorie reduction is maintained in the product after oven reconstition. Alternatively, one can meet nearly any specific calorie level for the french fries that is greater than the calorie level previously mentioned for the baked potato (circa 80 calories per 3 oz serving). In actual testing of the invention less than 100 calories per 3 oz serving has been achieved for the small cuts (and is preferably in the range of 90–120 calories) and as low as 85 calories per 3 oz serving for the large cuts (with the preferred range being 85–100 calories). A significant feature of this invention is the fact that these lower calorie and oil levels are maintained in the home cooking oven relative to the calorie and oil levels of the deep fat preparation in the home or in the restaurant.

As noted previously, the reduced frying time or the oil spray limits the amount of oil that is absorbed into the potatoes. Typically, french fries prepared according to the present invention have up to 40% less oil than conventional fries. In addition to reducing the calorie value of the food product, the lower oil content also results in an enhanced flavor, in that more of the actual potato taste is discernible since it is not hidden by as much oil.

For all of the procedures described above, it should be noted that good manufacturing practices should be strictly followed. This concern applies especially in the area of sanitary production procedures because there is no long hot oil immersion step to sterilize the product. Thus belts and work areas should be sanitized.

While specific preferred ingredients and processing steps have been disclosed to facilitate an understanding of the invention, it will be appreciated that functional equivalents can be substituted or additional steps added without departing from the spirit or essential characteristics of the present invention. Accordingly, the presently disclosed embodiments are considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A process for preparing a frozen french fry product having a lower calorie and oil content in comparison with a conventional french fry, comprising the steps of:
   slicing potatoes to produce elongated potato strips;
   blanching the potato strips;
   immersing the potato strips in a solution containing 0.2 to 0.4% by weight sodium acid pyrophosphate and 0.5 to 3.5% by weight caramel;
   frying the potato strips in oil for a total maximum time of 40 seconds; and then
   freezing the fried potato strips.

2. The process of claim 1 wherein said solution is at a temperature in the range of 140°–180° F. and the strips are immersed therein for 20–40 seconds.

3. The process of claim 1 wherein said oil is at a temperature in the range of 275°–390° F.

4. The process of claim 1 wherein said solution contains 2.8 to 3.0% by weight caramel.

5. The process of claim 1 wherein said solution further includes 0.5 to 2.5% by weight of a reducing sugar.

6. The process of claim 5 wherein said reducing sugar is glucose.

7. The process of claim 1 further including the step of at least partially drying said potato strips to remove up to 20% of their weight after they are immersed in the solution and prior to frying them.

8. The process of claim 1 wherein said blanching step comprises the following sequence of steps:
   immersing the potato strips in water at a temperature of 140°–170° F. for 5–18 minutes;
   immersing the potato strips in water at a temperature of 90°–140° F. for 2–8 minutes; and then
   immersing the potato strips in water at a temperature of 170°–195° F. for 2–8 minutes.

9. A process for preparing a frozen french fry product having a lower calorie and oil content in comparison with a conventional french fry, comprising the steps of:
   slicing potatoes to produce elongated potato strips;
   blanching the potato strips;
   immersing the potato strips in a solution containing 0.2 to 0.4% by weight sodium acid pyrophosphate and 0.5 to 3.5% by weight caramel;
   spraying the potato strips with a fine coat of oil at a temperature in the range of 120°–200° F. to increase the weight of the potato strips by 1 to 3%; and then
   freezing the sprayed potato strips.

10. The process of claim 9 wherein said solution is at a temperature in the range of 140°–180° F. and the strips are immersed therein for 20–40 seconds.

11. The process of claim 9 wherein said solution contains 2.8 to 3.0% by weight caramel.

12. The process of claim 9 wherein said solution further includes 0.5 to 2.5% by weight of a reducing sugar.

13. The process of claim 12 wherein said reducing sugar is glucose.

14. The process of claim 9 further including the step of at least partially drying said potato strips to remove up to 20% of their weight after they are immersed in the solution and prior to the time they are sprayed with oil.

15. The process of claim 9 wherein said blanching step comprises the following sequence of steps:
   immersing the potato strips in water at a temperature of 140°–170° F. for 5–18 minutes;
   immersing the potato strips in water at a temperature of 90°–140° F. for 2–8 minutes; and then
   immersing the potato strips in water at a temperature of 170°–195° F. for 2–8 minutes.

* * * * *